(12) United States Patent
Stokes

(10) Patent No.: US 11,631,350 B2
(45) Date of Patent: Apr. 18, 2023

(54) ROTATING DISPLAY

(71) Applicant: Design on Impulse Limited, Totnes (GB)

(72) Inventor: Doug Stokes, Totnes (GB)

(73) Assignee: Design on Impulse Limited, Devon (GB)

(*) Notice: Subject to any disclaimer, the term of this patent is extended or adjusted under 35 U.S.C. 154(b) by 0 days.

(21) Appl. No.: 17/242,607

(22) Filed: Apr. 28, 2021

(65) Prior Publication Data

US 2021/0344894 A1    Nov. 4, 2021

(30) Foreign Application Priority Data

Apr. 29, 2020 (GB) ...................................... 2006319

(51) Int. Cl.
| | | |
|---|---|---|
| *G09G 3/00* | (2006.01) | |
| *G09G 3/32* | (2016.01) | |
| *H04N 13/393* | (2018.01) | |

(52) U.S. Cl.
CPC ............. *G09G 3/003* (2013.01); *G09G 3/005* (2013.01); *G09G 3/32* (2013.01); *H04N 13/393* (2018.05);
(Continued)

(58) Field of Classification Search
CPC .......... G09G 3/003; G09G 3/005; G09G 3/32; G09G 2310/0224; G09G 2310/0297; G09G 2360/18; H04N 13/393
See application file for complete search history.

(56) References Cited

U.S. PATENT DOCUMENTS 4,160,973 A * 7/1979 Berlin, Jr. ............ H04N 13/393
    345/82
4,300,232 A * 11/1981 Kato ..................... H04J 3/0602
    370/535
(Continued)

FOREIGN PATENT DOCUMENTS

| CN | 110515213 A | 11/2019 |
| WO | 02/21489 A2 | 3/2002 |

(Continued)

OTHER PUBLICATIONS

European Search Report dated Sep. 23, 2021 in EP Application No. 21170988.6.
(Continued)

*Primary Examiner* — Gene W Lee
(74) *Attorney, Agent, or Firm* — Occhiuti & Rohlicek LLP

(57) ABSTRACT

A rotating display, for creating a three-dimensional image, that includes a display panel configured to rotate about an axis and comprising a plurality of groups of light emitting elements, with each element being individually controllable and configured to display a plurality of pixels of the image, a processor to receive pixel data for the display panel and divide the data into a plurality of pixel data lines, each line comprising pixel data for only one of the groups of light emitting elements, a buffer to receive one or more of the data lines, for each group of light emitting elements, and a demultiplexer configured to receive a pixel data line and provide pixel data to each light emitting element according to a refresh rate of the display panel. The display panel is configured to rotate about the axis at a rate commensurate with the refresh rate of the display panel.

20 Claims, 8 Drawing Sheets

(52) U.S. Cl.
CPC ............... *G09G 2310/0224* (2013.01); *G09G 2310/0297* (2013.01); *G09G 2360/18* (2013.01)

(56) References Cited

U.S. PATENT DOCUMENTS

| | | | |
|---|---|---|---|
| 6,469,743 B1* | 10/2002 | Cheney | .................. H04N 9/641 |
| | | | 326/38 |
| 7,477,252 B2 | 1/2009 | Chun | |
| 2005/0035962 A1 | 2/2005 | Ishibashi et al. | |
| 2009/0027369 A1* | 1/2009 | Lee | ...................... G09G 3/3275 |
| | | | 345/204 |
| 2009/0179852 A1* | 7/2009 | Refai | ...................... H04N 13/39 |
| | | | 345/107 |
| 2009/0278984 A1* | 11/2009 | Suzuki | .................. H04N 7/081 |
| | | | 348/554 |
| 2012/0256757 A1* | 10/2012 | Kwan | .................... H05B 45/00 |
| | | | 340/691.1 |
| 2012/0306826 A1 | 12/2012 | Tsuchi | |
| 2013/0100126 A1 | 4/2013 | Kim et al. | |
| 2014/0152672 A1* | 6/2014 | Seder | ..................... G09G 3/005 |
| | | | 345/473 |

FOREIGN PATENT DOCUMENTS

| WO | 2013/142725 A1 | 9/2013 |
|---|---|---|
| WO | 2019151544 A1 | 8/2019 |

OTHER PUBLICATIONS

British Search Report under Section 17(5) dated Nov. 12, 2020 in GB Application No. 2006319.4.

\* cited by examiner

ROTATING DISPLAY

CROSS-REFERENCE TO RELATED APPLICATIONS

This application claims priority to, and the benefit of, UK Application No. GB 2006319.4, entitled "ROTATING DISPLAY" and filed on Apr. 29, 2020, the content of which is incorporated herein by reference in its entirety.

FIELD

This invention relates to a rotating display and a method of creating a three-dimensional image on the same.

BACKGROUND

The term persistence of vision (PoV) traditionally refers to the optical illusion that occurs when visual perception of an object does not cease for some time after the rays of light proceeding from it have ceased to enter the eye. The human visual system can process and individually perceive 10-12 images per second, with higher rates being perceived as motion. PoV means the human visual system perceives short, single millisecond visual stimuli as having a duration of between 100 ms and 400 ms.

PoV has previously been used in LED display devices that compose images by displaying one spatial portion of the image at a time in rapid succession. A two-dimensional PoV display can be achieved by means of rapidly moving a single row of LEDs along a linear or circular path. A common example of this can be seen in the use of bicycle wheel lights that appear to produce persistent patterns when the wheels are in motion. Three-dimensional PoV displays (sometimes referred to as volumetric displays) can be constructed using a 2D grid of LEDs which is swept through a volume.

Large numbers of LEDs need to run at a very high refresh rate in order to achieve a high resolution PoV effect. Thus, a high data rate is needed to control the LEDs. This required data rate is higher than known systems can achieve using the current standard protocols for LED control. Due to these and other issues, previous displays have resorted to simply storing data for playback and lack the ability to display "live" data that is received or generated at runtime. Storing data for playback to a high resolution PoV display requires significant storage space to be provided to the system. Furthermore, systems that use large numbers of LEDs have difficultly adequately dissipating the heat generated by the LEDs.

SUMMARY OF THE INVENTION

According to the present invention there is provided a rotating display for creating a three-dimensional image, the rotating display comprising: a display panel configured to rotate about an axis, the display panel comprising a plurality of groups of light emitting elements, each light emitting element being individually controllable and configured to display a plurality of pixels of the three-dimensional image; a processor configured to receive pixel data for the display panel and divide the pixel data into a plurality of pixel data lines, each pixel data line comprising pixel data for only one of the groups of light emitting elements; a buffer configured to receive one or more of the data lines; for each group of light emitting elements: a demultiplexer configured receive a pixel data line and to provide data to each light emitting element of the group according to a refresh rate of the display panel; and wherein the display panel is configured to rotate about the axis at a rate commensurate with the refresh rate of the display panel.

The pixel data received by the processor may comprise a two-dimensional video frame to be displayed on the display panel.

The pixel data received by the processor may comprise a plurality of channels for each pixel and the data for each pixel being arranged sequentially such that data for all of the channels for a given pixel precedes the data for all of the channels for the next pixel in the sequence.

Each group of light emitting elements may comprise a plurality of subsets of light emitting elements, each subset consisting of a plurality of light emitting elements wired in series.

Each light emitting element except the terminal light emitting element in each subset may comprise a discrete integrated circuit configured to receive pixel data, emit light in dependence on the received pixel data, and output the pixel data to the subsequent light emitting element in the subset.

Each subset of light emitting elements may comprise a power supply that is electrically isolated from the power supply of the other subsets.

The processor may be further configured to interlace the pixel data corresponding to two or more pixels on one or more of the data lines.

The processor may be further configured to output supplementary data on a supplementary data line, wherein the supplementary data comprises one or more of: status data indicating the status of the processor, and an error checking code.

The brightness of each light emitting element may be controlled in dependence on its distance from the axis of rotation of the display panel.

The brightness of each light emitting element may increase commensurate with its distance from the axis of rotation of the display panel.

The brightness of the light emitting elements may be controlled by one or more of: the display panel being configured to vary the current provided to the light emitting elements, and the processor being configured to scale the pixel data.

The processor may be configured to receive pixel data encoded according to a differential signalling protocol.

The display panel may be configured to rotate about the axis such that the rate of rotation of the display panel is a factor of the refresh rate of the display panel.

Each demultiplexer may comprise a serial-in parallel-out shift register.

Each parallel output of each demultiplexer may be configured to provide data to only one of the subsets of light emitting elements.

One or both of the pixel data received by the processor and the pixel data on the data lines may be uncompressed.

The processor may be configured to output the data lines at a rate commensurate with the rate of rotation of the display panel about the axis.

Each light emitting element may comprise a discrete light emitting element.

The light emitting elements may be arranged in rows that are not parallel with an intended point of view for all angular positions of the display panel about the axis.

The light emitting elements may be arranged in rows that are not parallel with the first axis for all angular positions of the display panel about the axis.

The intended point of view may comprise a predefined direction relative to the display panel. The intended point of view may be defined as being at a fixed angle relative to the axis.

The light emitting elements may be matrix addressed.

The processor may be fixed to the display panel. The processor may be configured to receive pixel data for the display panel from a device that is external to the rotating display.

The buffer may comprise random access memory. The buffer may comprise dynamic random access memory.

There is also provided a method of creating a three-dimensional image using a rotating display, the rotating display comprising a display panel configured to rotate about an axis, the display panel comprising a plurality of groups of light emitting elements, each light emitting element being individually controllable and configured to display a plurality of pixel of the three-dimensional image, a processor, one or more buffers, and for each group of light emitting elements, a demultiplexer, the method comprising: receiving pixel data at the processor for the display panel and dividing the pixel data into a plurality of pixel data lines, each pixel data line comprising pixel data for only one of the groups of light emitting elements; buffering the pixel data lines at the one or more buffers, for each group of light emitting elements: receiving the respective pixel data line from the one or more buffers at a corresponding demultiplexer and providing pixel data to each light emitting element of the group according to a refresh rate of the display panel; and rotating the display panel about the axis at a rate commensurate with the refresh rate of the display panel.

The pixel data received by the processor may comprise a two-dimensional video frame to be displayed on the display panel.

The pixel data received by the processor may comprise a plurality of channels for each pixel and the data for each pixel being arranged sequentially such that data for all of the channels for a given pixel precedes the data for all of the channels for the next pixel in the sequence.

Each group of light emitting elements may comprise a plurality of subsets of light emitting elements, each subset consisting of a plurality of light emitting elements wired in series.

The method may further comprise rotating the display panel about the axis such that the rate of rotation of the display panel is a factor of the refresh rate of the display panel.

The method may further comprise controlling brightness of each light emitting element in dependence on its distance from the axis of rotation of the display panel.

The method may further comprise controlling the brightness of each light emitting element to increase commensurate with its distance from the axis of rotation of the display panel.

DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention and is provided in the context of a particular application. Various possible modifications to the disclosed embodiments will be readily apparent to those skilled in the art.

Figure 1:
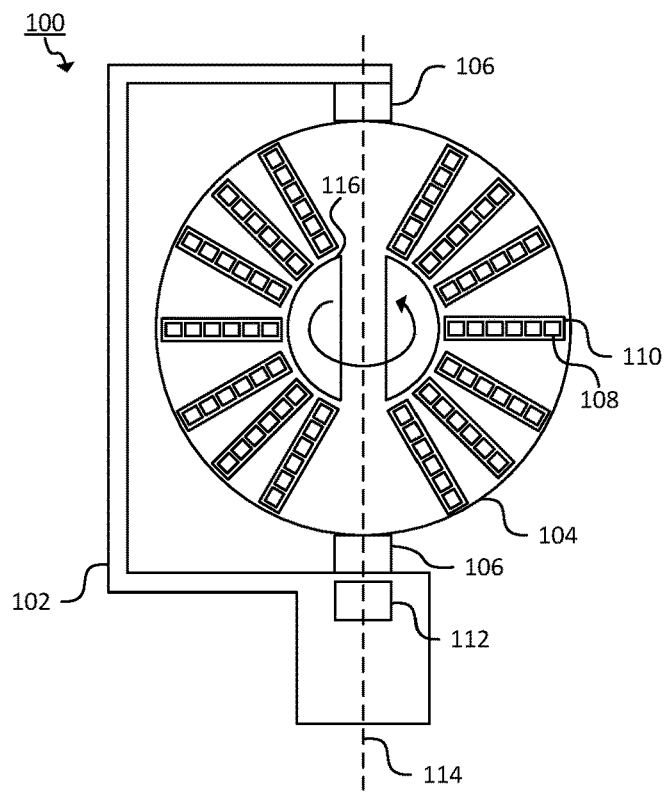
FIG. 1 shows a schematic view of a display.

FIG. 1 shows a schematic view of an exemplary display 100. Display 100 may comprise a supporting frame 102 for supporting a display panel 104. Display panel 104 may be substantially planar or curved and may have any perimeter shape. The display panel 104 may have any suitable supporting structure. The display panel 104 may be supported by one or more bearing assemblies 106. In the example shown in FIG. 1, display panel 104 is supported by two sets of bearing assemblies 106 arranged along the axis of rotation 114 of the display panel.

Display panel 104 comprises a plurality of light emitting elements 108 arranged in groups. The light emitting elements may be discrete elements. In this context, discrete may mean that the light emitting elements are separate and distinct. More specifically, discrete may mean that the light emitting elements each comprises an individual integrated circuit. The light emitting elements 108 may be LEDs, LCD displays, filament (or incandescent) lighting elements or fluorescent lighting elements. Each group may comprise a plurality of light emitting elements 108. Each group may comprise one or more subsets 110 of light emitting elements 108. In other words, one or more subsets 110 of light emitting elements 108 may make up a group. Each subset 110 may comprise a substantially linear strip of light emitting elements 108. Each subset 110 may comprise a matrix of light emitting elements 108. For example, a matrix may comprise a square or rectangular array of light emitting elements 108.

Each light emitting element 108 is individually controllable to display one or more different colours at a controllable brightness. Each light emitting element 108 may comprise a plurality of coloured elements which in combination can provide a range of different colours—for example, each light emitting element may comprise three individual red, green and blue light emitting elements. Each of the red, green and blue light emitting elements may have a controllable brightness that can be set to one of a range of values, for example each light emitting element may have a controllable brightness that can be set to one of 256 values. The light emitting element may display different colours by controlling its emitted light without additional filtering or modulation of the light by, for example by a liquid crystal based device. The subsets of light emitting elements 110 may be arranged in a two-dimensional pattern, for example a grid. In the example shown in FIG. 1, the subsets of light emitting elements 110 are arranged in a radial pattern on display panel 104. In a radial pattern, the subsets 110 extend outwards from a central point but do not necessarily meet at that central point.

It has been realised that addressing large numbers of light emitting elements poses a significant technical challenge. The light emitting elements 108 may all be connected in series, which has the advantage of being a simple wiring scheme that allows each light emitting element to be easily addressed. However, wiring all of the light emitting elements 108 in series can give rise to other problems such as latency issues resulting from propagating data through a large number of light emitting elements.

By arranging the light emitting elements in groups and providing data to each of those groups, as described in detail below, the present invention enables a large number of individually controllable light emitting elements 108 to be addressed as a display with significantly reduced latency.

The light emitting elements 108 within each group may be wired in series, for example, when each group comprises only one subset 110 and the light emitting elements 108 within that subset 110 are wired in series. Where each group comprises a plurality of subsets 110 of light emitting elements 108, the subsets 110 in a group may be wired in parallel to other subsets 110 in that group, such as in the example shown in FIG. 3 (e.g. subset 308-1 is wired in parallel to subset 308-2). The light emitting elements 110 within each subset may be wired in series. Each light emitting element 108 in a group or subset 110, except the terminal light emitting element 108 (i.e. the final emitting element in group or subset) may comprise a discrete integrated circuit configured to receive pixel data and may be configured to emit light in dependence on the received pixel data, and output the pixel data to the subsequent light emitting element 108 in the group or subset.

The display panel 104 is configured to rotate about a first axis 114. The first axis 114 may pass through one or more of the bearing assemblies 106. The first axis 114 may have any orientation—for example, the axis could be vertical or horizontal. The display panel 104 may be driven to rotate by one or more motors 112. The display panel 104 may be driven to rotate at a constant speed or driven at a speed controllable by a program or by a user. In examples where the subsets 110 of light emitting elements 108 are arranged in a radial pattern, the subsets 110 of light emitting elements 108 may be arranged radially about a second axis which is perpendicular to the first axis 114.

Figure 10A:
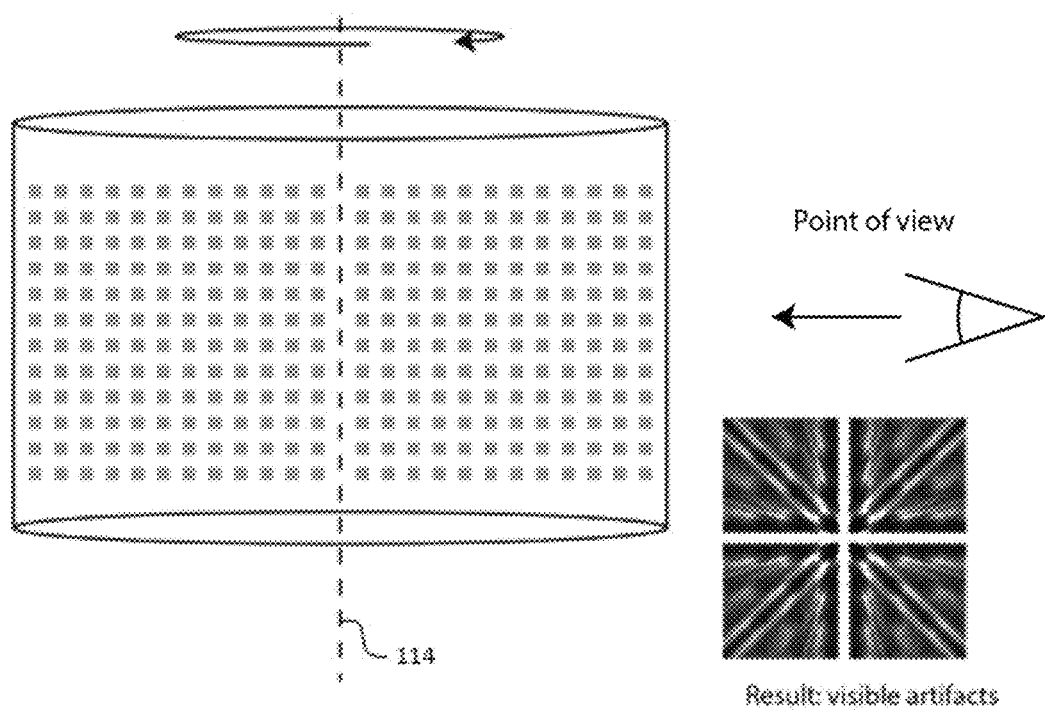
FIGS. 10A and 10B show exemplary arrangements of light emitting elements aligned with the intended point of view.
Figure 10B:
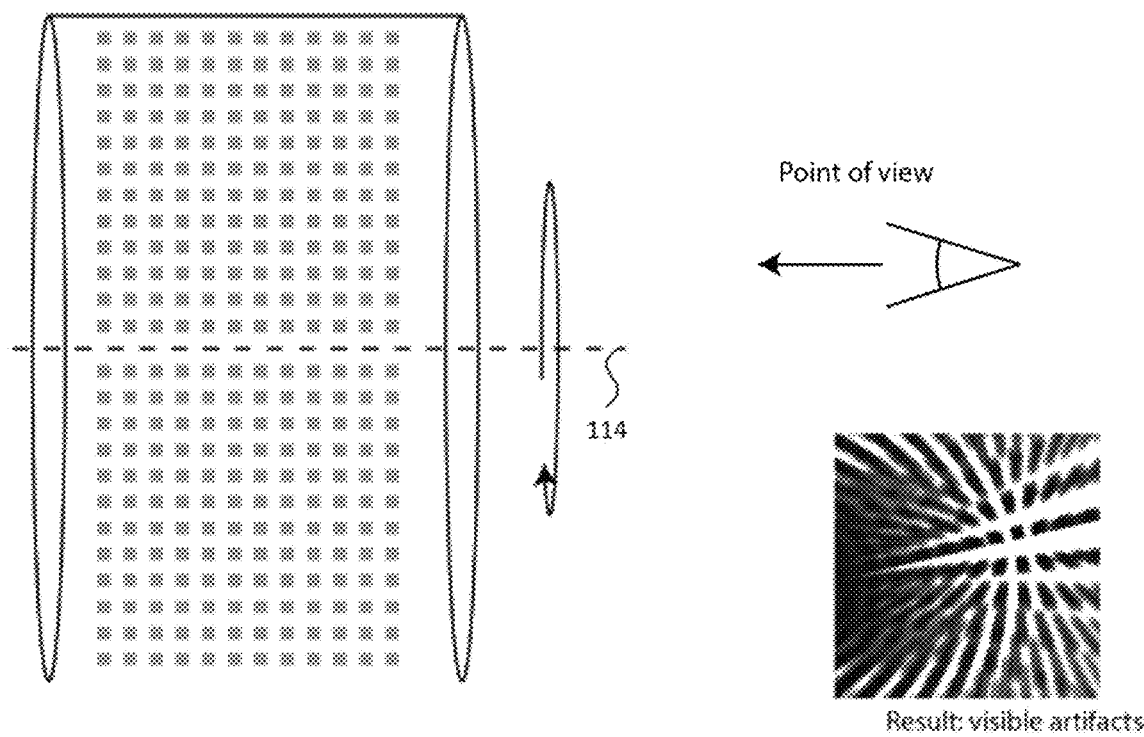

FIG. 10A shows an exemplary arrangement of light emitting elements. As shown, the light emitting elements may be arranged in a grid, aligned with both the axis of rotation (i.e. the first axis) 114 and an intended point of view. The light emitting elements may also be described as being arranged in rows. In this example, the first axis 114 and the intended point of view are perpendicular to one another. FIG. 10B shows a similar example, in which the light emitting elements are arranged in a grid, aligned with both the first axis 114 and an intended point of view. In this example, the first axis 114 and the intended point of view are parallel. While arrangement such as those shown in FIGS. 10A and 10B are simple to manufacture, having the light emitting elements aligned with the intended point of view can result in artifacts that are visible a viewer.

Figure 11A:
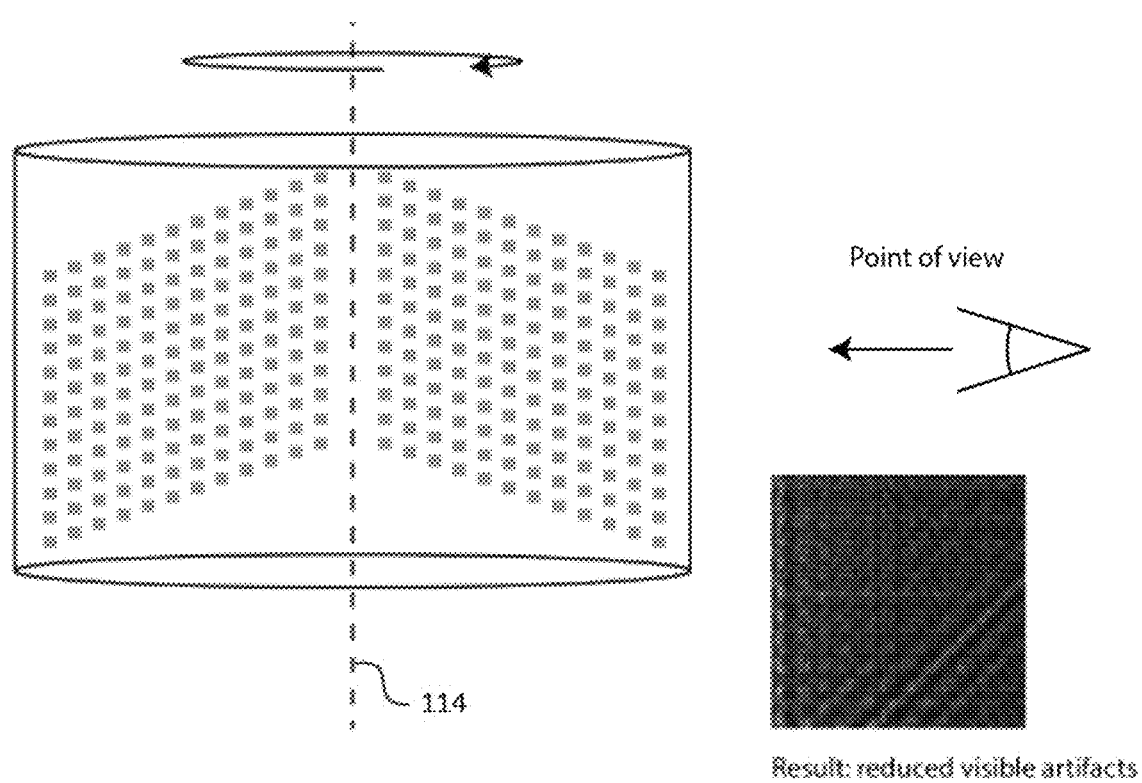
FIGS. 11A and 11B show exemplary arrangements of light emitting elements not aligned with the intended point of view.
Figure 11B:
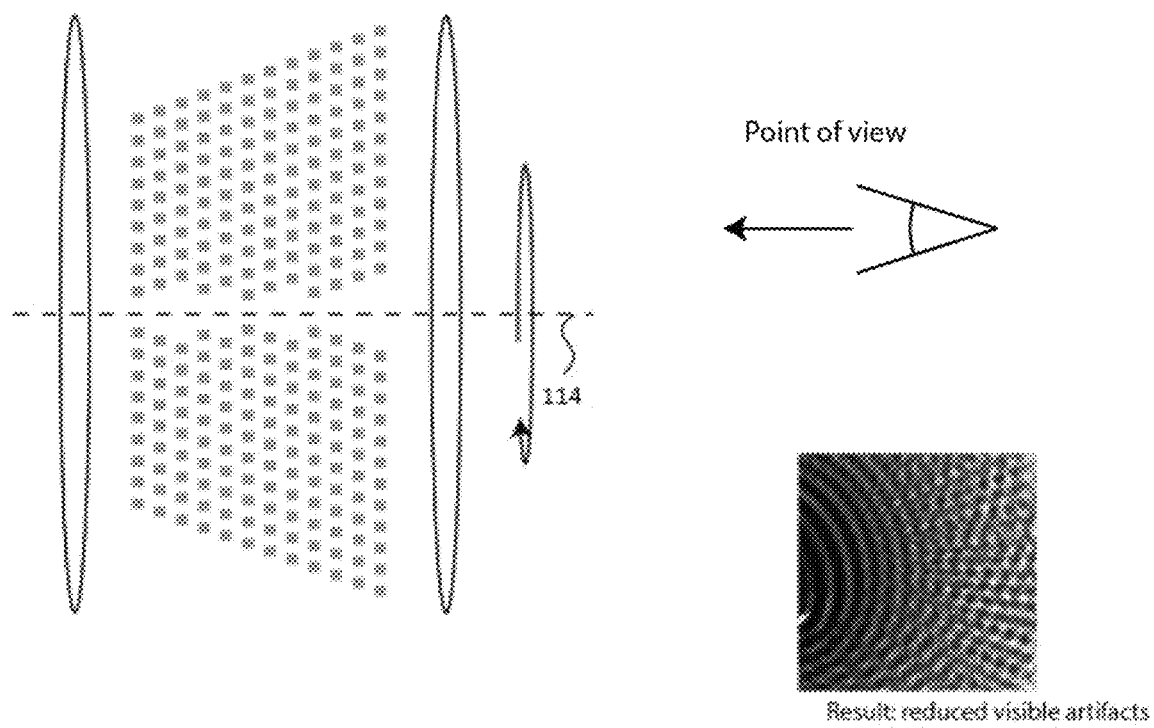

FIGS. 11A and 11B show exemplary arrangements of light emitting elements in which the light emitting elements are not aligned with an intended point of view during rotation. For example, the light emitting elements may be arranged in rows that are not parallel with an intended point of view and/or the light emitting elements may be arranged in rows that are not parallel with the first axis. More specifically, the light emitting elements may be arranged in rows that are not parallel with an intended point of view for all angular positions of the display panel about the first axis 114 and/or the light emitting elements may be arranged in rows that are not parallel with the first axis for all angular positions of the display panel about the first axis 114. More specifically, the light emitting elements may be arranged in rows that are not collinear with an intended point of view for all angular positions of the display panel about the first axis 114 and/or the light emitting elements may be arranged in rows that are not collinear with the first axis for all angular positions of the display panel about the first axis 114. A intended point of view being collinear with a row of light emitting elements refers to these lying on the same line. Having the light emitted elements be not aligned with the intended point of view can minimise artifacts that are visible to a viewer. The intended point of view may comprise a predefined direction relative to the display panel 104. The intended point of view may be defined as being at a fixed angle relative to the first axis 114.

The display may have a plurality of intended points of view. In other words, the display may be designed to be viewed from a plurality of directions. Where the display has a plurality of intended points of view, the light emitting elements may be arranged in rows that are not parallel with one or more of the intended points of view. The light emitting elements may be arranged in rows that are not parallel with all of the intended points of view. More specifically, the light emitting elements may be arranged in rows that are not collinear with all of the intended points of view. This can ensure that no unwanted artifacts are visible from each of the intended points of view.

One application of the present invention is to write two-dimensional frames of video data to the display panel 104 such that each frame dictates the colour and/or brightness of each light emitting element 108 at a point in space. For a subsequent frame, the light emitting elements 108 will have moved to a new position so the subsequent frame dictates the colour and/or brightness of each light emitting element at a different point space. Thus, the rotating display displays sequential two-dimensional frames that can, through PoV, appear as a display a three-dimensional image. The two-dimensional frames may be determined by taking slices of a three-dimensional scene.

The display panel 104 may comprise one or more apertures 116 or recesses. The display panel 104 shown in FIG. 1 comprises two circular segment shaped apertures 116. Apertures 116 may be used to reduce the cross-sectional area of the display panel 104, thus reducing drag during rotation. Apertures 116 and recesses may be used to reduce the mass/inertia of the display panel, thus reducing the energy required to increase and decrease the speed of rotation and reducing the centrifugal force acting on the panel.

The display panel 104 may also be used to assist in cooling the light emitting elements 108. The display panel 104 may be configured to act as a heat sink for the light emitting elements 108. The display panel 104 may comprise a highly thermally conductive material, such as copper or an aluminium alloy. The display panel 104 may be shaped to maximize its surface area in contact with the surrounding air. For example, the display panel 104 may comprise a plurality of fins. The fins may be aligned with the direction of motion. Fins aligned with the direction of motion serve to increase surface area whilst incurring minimal drag. Fins aligned with the direction of motion allow for greater air flow rate past the fins, increasing the rate of heat transfer.

The display 100 may also comprise an airtight enclosure and a pump configured to substantially evacuate air from the enclosure. The display panel 104 may be arranged within the enclosure. Evacuating the enclosure substantially reduces the drag on the display panel 104 when rotating. This allows for larger display panels 104 to be used, allowing for a greater number of light emitting elements to be mounted thereon. This in turn increases the total pixel count of the display by greater than the increase in light emitting element numbers (described below). If the display panel 104 is arranged within an evacuated enclosure, other methods of cooling the light emitting elements and other electronics may be required. For example, the display 100 may further comprise liquid cooling apparatus.

In order to provide power to the display panel 104, one or more of the bearing assemblies 106 may comprise a slip ring configured to convey power from the non-rotating part of display 100 to the rotating display panel 104. Similarly, in order to provide data to the display 100, one or more of the bearing assemblies may comprises a slip ring configured to transfer data from the non-rotating part of display 100 to the rotating display panel 104, such as a data encoded according to a standard such as high-definition multimedia interface (HDMI), universal serial bus (USB), or ethernet.

Conventional liquid crystal based displays are insufficiently bright for large scale, fast moving PoV displays as the brightness of the display is spread across a volume as the display moves through space. This problem is particularly acute when a display is to be used in an already brightly lit area, for example a shopping centre or sports arena. For this reason, it is advantageous to use groups of individually controllable light emitting elements, for example LEDs, that have a higher light output than conventional liquid crystal based displays. The light output of the light emitting elements may be increased by providing larger currents thereto. The light emitting elements may have an output of greater than 250, 500, 1000, 2000, or 3000 lumens.

The groups or subsets 110 of the groups of light emitting elements 108 may each be provided with their own respective power supply. These power supplies may be electrically isolated from one another. Issues may occur where the colour of the light emitting elements varies across the group when attempting to display a single colour on a large number of light emitting elements that are powered using a single power supply. This is caused by a voltage drop across the group or subset and is mitigated by providing individual power supplies for each group of light emitting elements 110 or subset 110 thereof.

The total effective pixel count of the display 100 in the three-dimensional volume in which the display panel 104 rotates, $P_{TOTAL}$ will generally be given by:

$$P_{TOTAL} = \frac{LC_T}{f} \quad (1)$$

where L is the number of LEDs, $C_T$ is the refresh rate of each light emitting element (refreshes per second) and f is the frequency of rotation (rotations per second) or equivalently by:

$$P_{TOTAL} = LC_R \quad (2)$$

where $C_R$ is the number of refreshes each light emitting element is capable of undergoing in a single rotation of the display panel (refreshes per rotation). In this context, a pixel should be understood to comprise the smallest portion of the display that, by the action of an individually controllable light emitting element 108, displays a given colour. Thus, a single light emitting element 108 will contribute many effective pixels to the display as that light emitting element 108 moves through the volume and changes colour. In three-dimensional displays, pixels may be referred to as a voxels. For example, a display comprising L=300 light emitting elements, each with a refresh rate of $C_T$=2000 Hz, and rotating f=10 times per second can provide a three-dimensional display with 60000 pixels. Controllable groups of LEDs with inbuilt controllers with refresh rates of 19.2 kHz are available. Faster refresh rates can be achieved with controllers that are separate to the LEDs.

Figure 2:
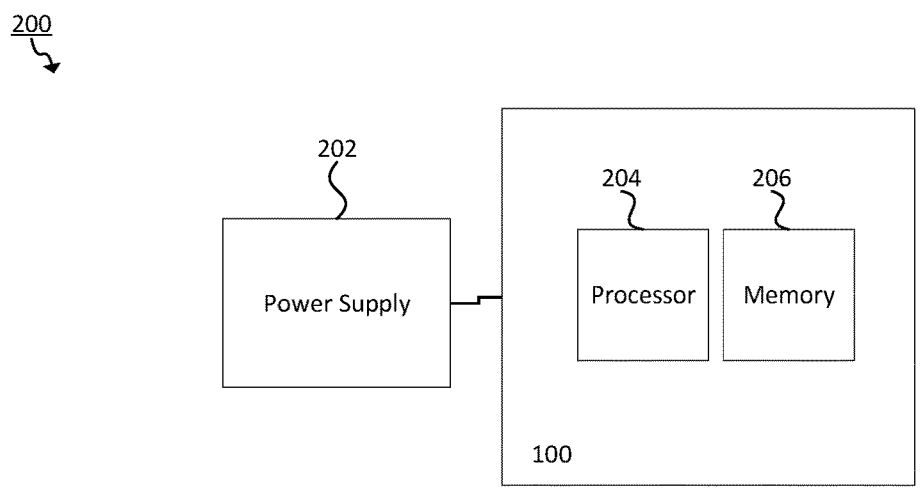
FIG. 2 shows a schematic diagram of the system for driving the display.

FIG. 2 shows a schematic diagram of a system 200 for driving the display 100. The system may comprise a power supply 202. Display 100 comprises a processor 204. Processor 204 may comprise a CPU, a GPU, an FPGA or may comprise dedicated fixed function circuitry. Preferably processor 204 is a GPU. The processor 204 may be arranged on or within the display panel 104. Alternatively, the processor 204 may be arranged on or within the non-rotating parts of the display 100, for example, on supporting frame 102. Processor 204 may have access to a memory 206. The processor 204 may be configured to provide pixel data to the groups of light emitting elements. Memory 206 may comprise non-volatile memory (such as a hard drive or solid state drive), or transitory memory including caches or buffers in RAM.

Figure 3:
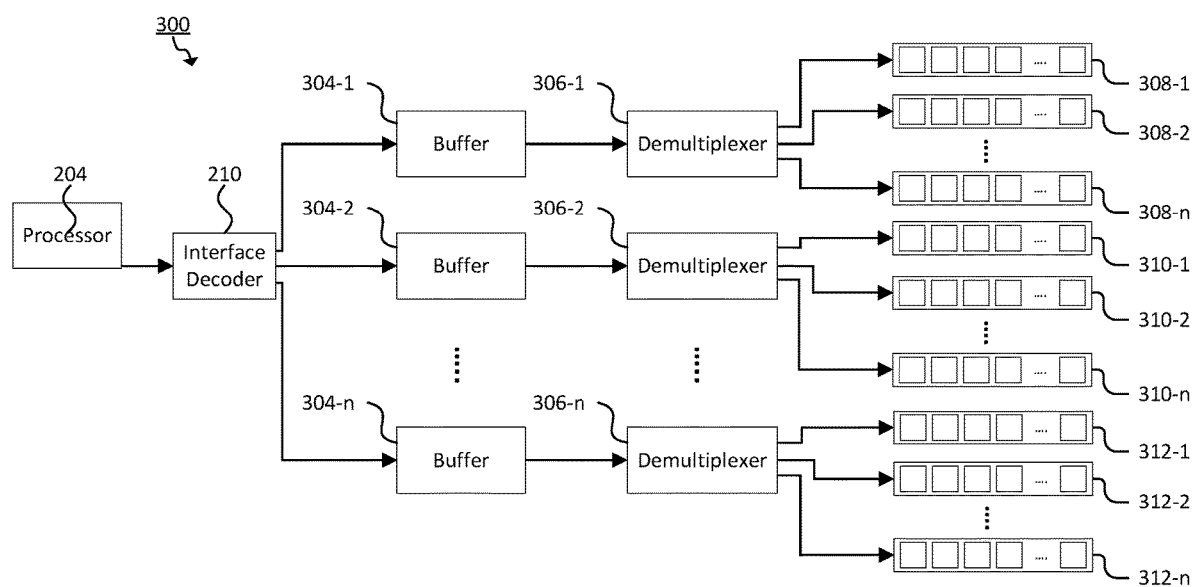
FIG. 3 shows a schematic diagram of a driving apparatus.

FIG. 3 shows a schematic diagram of a driving apparatus 300. Driving apparatus 300 comprises processor 204. Processor 204 is configured to receive pixel data for the display panel 104 and divide the pixel data into a plurality of data lines, each pixel data line comprising pixel data for only one of the groups of light emitting elements 108. The dividing of the pixel data by the processor 204 may be considered to be a form of encoding. The data lines are then provided to the respective groups of light emitting elements 108, as will be explained in detail below. The pixel data received by the processor 204 may have been previously generated by the processor 204, or it may have been generated by an external processor, or it may be retrieved from memory 206.

A host system (not shown), external to display 100 may send data to the display 100. The data sent by the host system may comprise geometry data which may include vector, shape and size data. The host system may send data to the display 100 via one or more slip rings. The host system may send data to the display via a wireless connection using, for example, radio transmission protocols which may include Wi-Fi, Bluetooth® and near-field communication (NFC). The host system may provide pixel data to the display 100, and in particular to processor 204.

As the display panel rotates, light emitting elements 108 more distant from the axis of rotation 114 are moving faster than more central light emitting elements 108. Thus, the light given out by the light emitting elements more distant from the axis of rotation 114 in a given time is spread over a larger area. This has the effect of light emitting elements 108 more distant from the axis of rotation 114 appearing dimmer than the more central light emitting elements 108. The processor 204 may thus be configured to control the brightness of the light emitting elements 108. In the example of a rotating display 100, processor 204 may be configured to control the brightness of the light emitting elements 108 in dependence on their distance from the first axis 114. In other words, the brightness of light emitting elements 108 at different distances from the first axis 114 may be controlled to have different brightness, with the brightness of each determined in dependence on its distance from the first axis 114. The brightness of the light emitting elements 108 may be controlled to increase commensurate with their distance from the first axis 114. The brightness may scale linearly, quadratically or exponentially with the distance of a light emitting element 108 from the first axis 114. The brightness may be scaled to be proportional to the distance of a light emitting element 108 from the first axis 114. The brightness may be scaled to be proportional to the square of the distance of a light emitting element 108 from the first axis 108.

The brightness may be controlled by varying the current provided to the light emitting elements 108. For example, the relationship between the brightness of an LED and the current applied to the LED will generally be known or could easily be experimentally determined. The brightness may be controlled (additionally or alternatively to varying the applied current) by scaling the pixel brightness data provided to each light element 108. For example, the pixel data provided to light emitting elements 108 closer the first axis 114 may be scaled down compared to the pixel data provided to light emitting elements 108 more distant from the first axis 114.

A frame of pixel data may be further sub-divided into a plurality of sub-frames. Each of the plurality of sub-frames may have the same duration, or each of the plurality of sub-frames may have a different duration. The brightness of light emitting element may different for each sub-frame. The pixel data may be configured to adjust the brightness of a given light emitting element in a given sub-frame.

As described above, processor 204 may be configured to divide the pixel data into a plurality of data lines. The data lines may carry data in series and provide the data to the groups of light emitting elements 108. These data lines may be output from processor 204 on individual cables, or on a single cable in parallel channels on, for example, an HDMI, DVI, or DisplayPort connection. When the data lines are output from processor 204 on a single cable, a video interface decoder 210 may be provided to divide the data lines such that they can be individually provided to physically separated, downstream components, as shown in FIG. 3.

Processor 204 may be configured to output data lines to one or more buffers 304. Each of buffers 304-1 to 304-$n$ receives one or more data lines from processor 204. The number of buffers 304 may be equal to the number of data lines, such that each buffer 304 is configured to receive one data line from processor 204. Alternatively, a single buffer 304 may be provided that is configured to receive each of the data lines from processor 204. Each data line comprises a portion of the received pixel data. Buffered data may then be read from buffers 304 at a constant rate. Data may be received by buffers 304 at a first rate and read out at a second rate. The first rate may be greater than the second. Setting the second rate to be lower than the first rate can be advantageous when the data input to the buffers 304 contains blank periods. The difference between the first and the second date rates then acts to remove blank periods in the data. The one or more buffers (304) may comprise random access memory (RAM). More specifically, the one or more buffers (304) may comprise dynamic random access memory (DRAM).

Data may be read from buffers 304-1 to 304-$n$ into demultiplexers 306-1 to 306-$n$. Hence, the demultiplexers 306 may be configured to receive a respective data line from a buffer 304. Data may then be output from each demultiplexer 306 to the respective group of light emitting elements 108. The plurality of light emitting elements 108 are arranged in groups, as described above in relation for FIGS. 1 and 3. The demultiplexers 306 receive pixel data intended for one group of light emitting elements 108. The demultiplexers 306 are configured to receive a pixel data line and provide pixel data to each light emitting element 108 of the group according to a refresh rate of the display panel. The demultiplexers 306 may be configured to write data to a single group of light emitting elements 108. The refresh rate is the rate at which the light emitting elements 108 change their colour and/or brightness. The refresh rate will generally be set by the rate at which data is provided to the light emitting elements.

The upper limit of the refresh rate will generally be limited by the hardware. As mentioned above, the groups may be further divided into subsets 110. For example, as shown in FIG. 3, data from demultiplexer 306-1 may be provided to the light emitting element group that includes subsets 308-1 to 308-$n$, and data from demultiplexer 306-2 may be provided to light emitting element group that includes subsets 310-1 to 310-$n$ etc. Alternatively, the demultiplexers 306 may be provided before the buffers 304, such that data is output from the processor 204 to demultiplexers 306, then output to buffers 304 and then to light emitting elements 308-312. The demultiplexers 306-1 to 306-$n$ may be serial-in parallel-out shift registers. Data will generally be output to the light emitting elements 108 sequentially at a lower clock speed than the data output by the processor 204, as the data initially output by the processor 204 is split up before it reaches the groups of light emitting elements 108.

The processor 204 may be configured to control (i.e. set or adjust) the rate at which the plurality of data lines are output. The rate that the plurality of data lines are output may be controlled to be commensurate with the rate of rotation of the display panel. The display panel is configured to rotate about the axis at a rate of rotation commensurate with the refresh rate of the light emitting elements. The display may comprise a control unit configured to rotate the display panel about the axis at a rate of rotation commensurate with the refresh rate of the light emitting elements. For example, the rate of rotation may be a factor of the refresh rate of the light emitting elements or, in other words, the refresh rate of the light emitting elements may be a multiple of the rate of rotation. This is in order to ensure that there are a whole number of two-dimensional frames displayed per rotation. For example, if there is 1 rotation per second, the light emitting elements may refresh 30 times per second. If a whole number of frames are not displayed per rotation then either: the displayed three-dimensional image may rotate over time, or it may become significantly more complicated to properly derive the two-dimensional frames so as to prevent the three-dimensional image from rotating.

Figure 4:
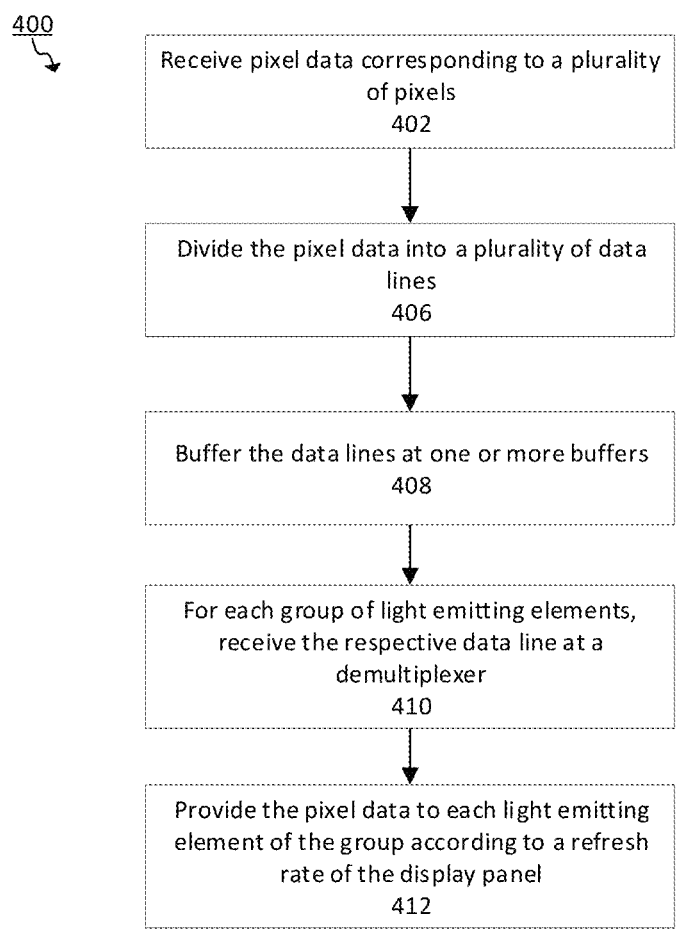
FIG. 4 shows the steps of the method performed by the driving apparatus.

FIG. 4 shows the steps of the method 400 performed by apparatus 300. Data corresponding to a plurality of pixels is received at step 402. The received pixel data is divided into a plurality of pixel data lines, each pixel data line comprising pixel data for only one of the groups of light emitting elements at step 406. As mentioned above, steps 402 and 406 may be performed by processor 204.

The data lines may then be buffered at one or more buffers 304 at step 408.

For each group of light emitting element 108, a respective data line is received at a demultiplexer at step 410. In this context, respective means relating to that group of light emitting elements 108, for example, for a group of light emitting elements 108 there is a respective demultiplexer that receives a respective data line, said data line comprising pixel data intended to be provided to that group. As discussed above, the data lines may then be read from each buffer at a constant rate. Step 412 comprises providing data to each light emitting element 108 of the group according to a refresh rate of the display panel 104.

The method 400 shown in FIG. 4 relates to the apparatus 300 in which the demultiplexers 306 appear downstream of the buffers 304. One can envision a similar method in which the data streams are output to respective demultiplexers 306 after step 406, then passed to buffers 304, then read at a constant rate to be output to a respective plurality of light emitting elements.

Figure 5:
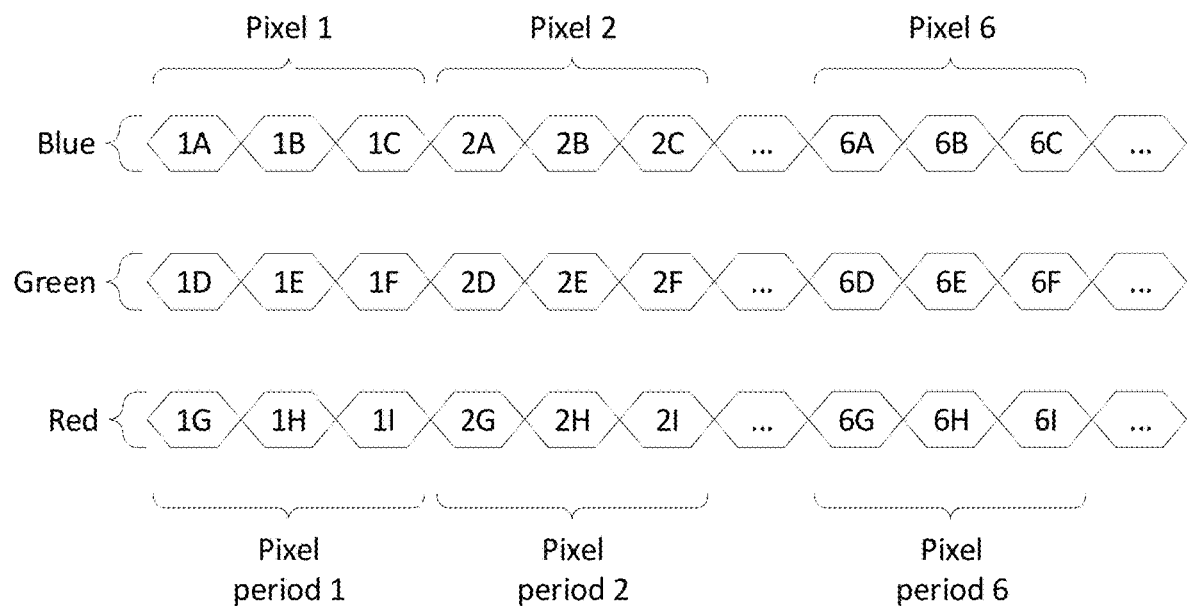
FIG. 5 shows an exemplary format for received pixel data.

FIG. 5 shows an exemplary format for received pixel data in which the pixel data for 6 pixels is received across 6 pixel periods and which has not yet been encoded according to the scheme described herein. A pixel period, which may also be referred to as a pixel clock period, is defined as the time necessary to transmit the data corresponding to one pixel, when it is in the format shown in FIG. 5. In this example, the pixel period is equal to 3 times the transmission period for singe bit. In this example, all of the bits corresponding to a single pixel are received in a single pixel period. For example, as shown in FIG. 5, all 9 bits corresponding to pixel 1, 1A-1I, are received in pixel period 1. In this example, the received pixel data is RGB encoded with 3 bits per colour channel. Bits 1A-1C determine the blue colour component, bits 1D-1F determine the green colour component, and bits 1G-1I determine the red colour component. An RGB pixel encoding using 8 bits per colour channel may be used. RGB 4:4:4 provides 24 bit per pixel colour depth. The received pixel data may be encoded to provide less than 24 bit per pixel colour depth. For example, the received pixel data may be encoded to provide 2, 3, 4, 6, 8 or 16 bits per pixel colour depth according to known encoding schemes. The received pixel data may be encoded to provide greater than 24 bit per pixel colour depth. For example, the received pixel data may be encoded to provide 30, 32, 36, or 48 bits per pixel colour depth according to known encoding schemes. Thus, as shown in FIG. 5, the receive pixel data may comprise a plurality of channels for each pixel and the data for each pixel being arranged sequentially such that data for all of the channels for a given pixel precedes the data for all of the channels for the next pixel in the sequence.

The received pixel data may be encoded according to differential signalling protocol, for example, a transition-minimized differential signalling (TMDS) protocol. Each colour component may be transmitted on a different TMDS channel. The TMDS protocol is used by digital visual interface (DVI), high-definition multimedia interface (HDMI), and DisplayPort applications. The pixel data may be received by the processor 204 via a DVI, HDMI, or DisplayPort interface.

Figure 6:
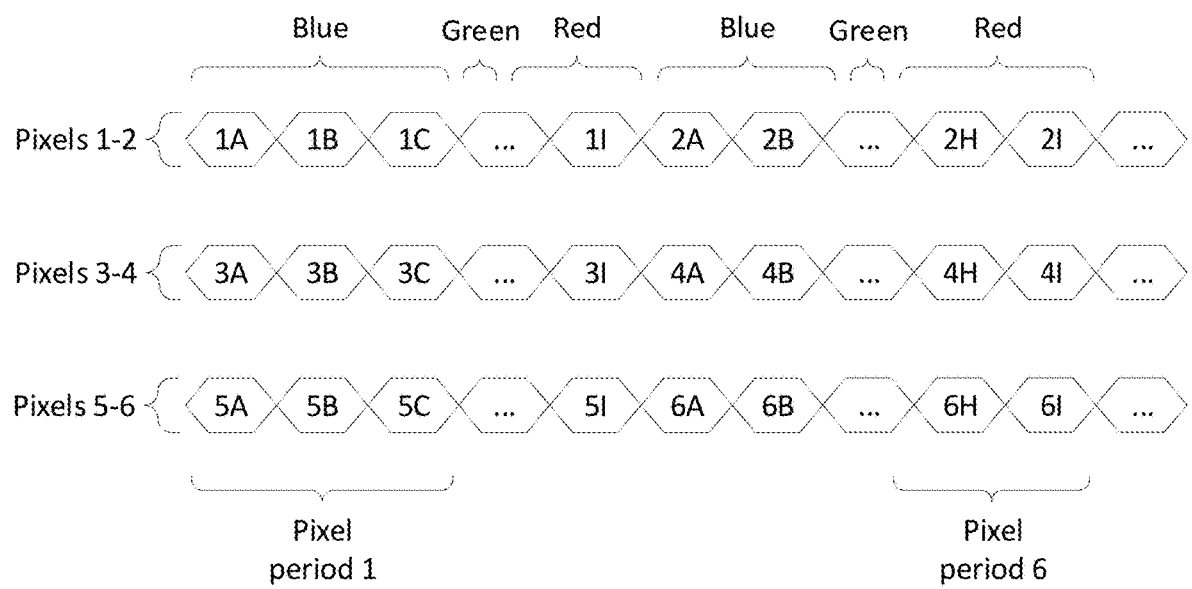
FIG. 6 shows an exemplary format for the divided pixel data.

The processor 204 is configured to receive pixel data for the display panel and divide the pixel data into a plurality of pixel data lines, each pixel data line comprising pixel data for only one of the groups of light emitting elements 108, An example of pixel data divided as such is shown in FIG. 6. The bits corresponding to all colour channels of the first and second pixels are sequentially output on the first data line. The bits corresponding to all colour channels of the third and fourth pixels are sequentially output on the second data line. The bits corresponding to all colour channels of the fifth and sixth pixels are sequentially output on the third data line. In this manner, the pixel data corresponding to a first and a second pixel are output in serial and the pixel data corresponding to the first and a third pixel are output in parallel.

The pixel data according to 6 pixels are output in 6 pixel periods. This can be extended to any number of pixels, N, and any number of data lines, L, where each data line carries the data corresponding to N/L pixels (though, as discussed below, further data lines may be provided to provide supplementary data).

Figure 7:
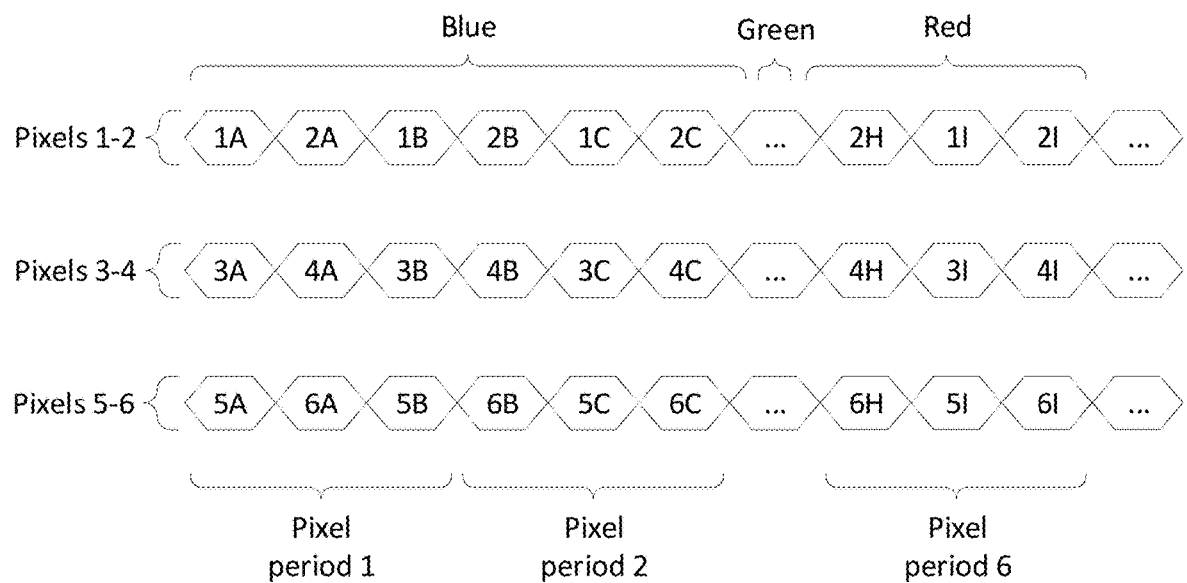
FIG. 7 shows an exemplary format for divided, interleaved pixel data.

The processor 204 may be configured to interleave or interlace pixel data corresponding to two or more of the pixels. FIG. 7 shows an example of interlaced data similar to that shown in FIG. 6, however, instead of the pixels to be output on a given data line being output sequentially, the pixels to be output on a given data line are interleaved such that they can be output concurrently. In the example shown in FIG. 6, the pixel data corresponding to pixels 1 and 2 are interleaved to be output on the first data line. A bit corresponding to pixel 1 is followed by a bit corresponding to pixel 2, and so on. The interleaving may alternatively be done for sets of 2, 3 or more pixels, for example, two bits corresponding to pixel 1 may be followed by 2 bits corresponding to pixel 2, and so on.

Figure 8:
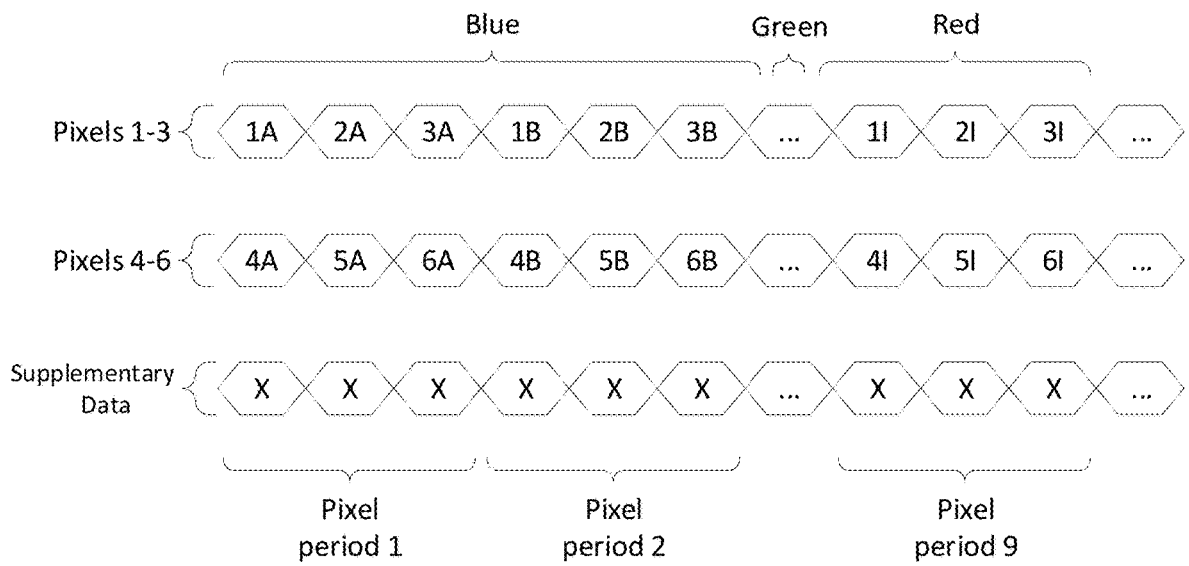
FIG. 8 shows an exemplary format for divided pixel data and supplementary data.

As shown in FIG. 8, The processor 204 may be configured to provide supplementary data on a data line. The data line carrying supplementary data may be referred to as a supplementary data line. The supplementary data may comprise status data indicating the status of the processor 204. For example, the status data may indicate whether the processor 204 is transmitting pixel data or not. The supplementary data may comprise an error checking or error correcting code, for example, a Hamming code. In a simple example, the error checking code may simply comprise a constant value (e.g. a 0 or a 1). If one or more downstream component, such as the video interface decoder 210, the buffers 304, the demultiplexers 306, or the light emitting elements 108 detect a value other than the expected constant value, then it is determined that an error or malfunction has occurred. The display 100 may be configured to shut down if it is determined that an error or malfunction has occurred. Shutting down the display 100 may comprise terminating the program to divide and output pixel data at the processor 204 or powering down one or more of the processor 204 and the light emitting elements 108. The supplementary data may comprise commands for the buffers 304, indicating when they should start and stop outputting pixel data. The supplementary data may comprise other metadata or configuration data. The supplementary data may comprise a combination of one or more of the examples listed above.

Figure 9:
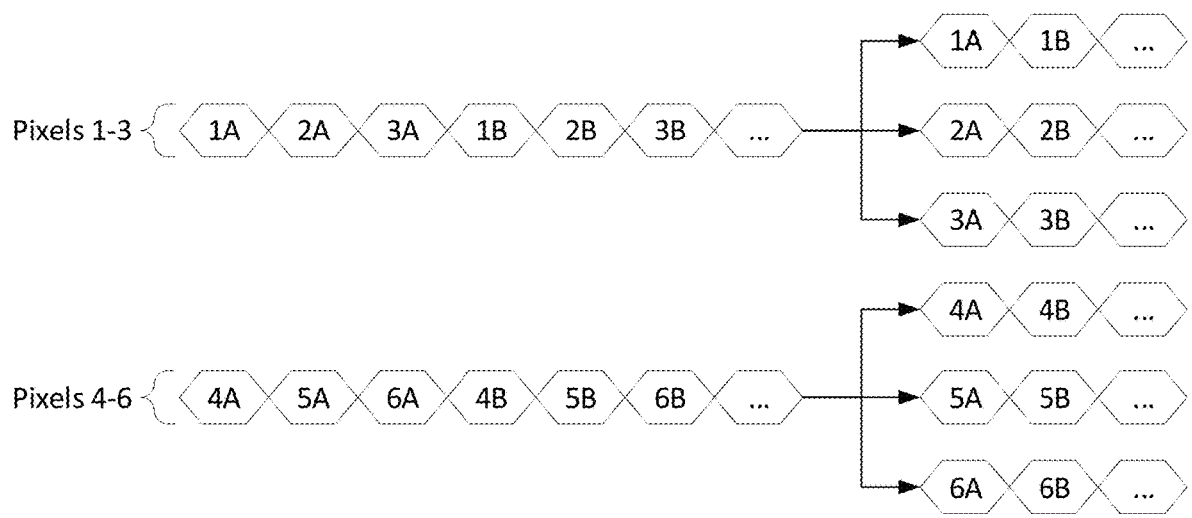
FIG. 9 shows two exemplary demultiplexing operations.

Each demultiplexer 306 may provide pixel data to the subsets 110 of light emitting elements in the corresponding group, for example, as shown in the example of FIG. 9. Each demultiplexer 306 may provide pixel data to the corresponding group in parallel. In the example of FIG. 9, a data line carrying data corresponding to 3 pixels (pixels 1-3) is received. This data is divided into 3 streams and each stream is provided to a different subset 110 of the light emitting elements. In this example, the demultiplexer 306 is configured to distribute the first received bit to the first stream, the second received bit to the second stream, and so on. Hence, each stream (corresponding to a subset 110 of a group of light emitting elements 108) receives 1 bit of data for every 3 bits of data in the data line. In this way, the demultiplexers 306 ensure that the appropriate pixel data is received by each subset 110 of a group of light emitting elements 108 and by each individual light emitting element 108 in series.

In the example shown in FIG. 9, the demultiplexer 306 results in the downstream components receiving data at a lower rate (one third in this example), compared to the rate at which the data arrives at the demultiplexer 306. The number of streams that the data is split into corresponds to the reduction in data rate. For example, if each demultiplexer 306 splits the data into 8 streams, the data rate in each stream will be an eighth of the data rate received at the demultiplexers 306. A further example of a demultiplexing operation is shown in FIG. 9, with a data line carrying pixel data for pixels 4-6 being received, separated and distributed accordingly. Furthermore, while it is mentioned above that the buffers 304 may be arranged downstream of the demultiplexers 306, it is preferable that the buffers 306 be upstream of the demultiplexers 306 (i.e. before the data is further separated) as fewer buffers 306 will be required.

The pixel data output by the processor 204 may be uncompressed, as is shown in FIGS. 6 to 9. For example, an equal or greater number of bits of pixel data that are received or generated by processor 204 may be output by processor on the data lines.

The invention described herein provides several advantages. The processor 204 divides the data such that the data corresponding to an individual pixel is output on the same data line, i.e. pixel data for each individual pixel is serialised, as opposed to the format shown in FIG. 5. This allows the data lines to be conveniently further separated and provided to different components, for example by demultiplexers 306. The dividing may be done at high clock speeds, particularly in examples where the processor 204 is a GPU which are particularly suited for rapidly performing large numbers of simple operations. Outputting data at a high clock speed, along several data lines, allows the data to be further split up later, for example by demultiplexers 306. This conveniently allows one processor 204, outputting data at one clock speed along a plurality of data lines (2 or 3 in the examples given above), to be used to provide pixel data simultaneously to large number of light emitting elements (i.e. potentially much greater than the number of data lines) at a slower clock speed.

This can be usefully applied to displays comprising large numbers of bright (i.e. high-powered) light emitting elements 108 which may need be separated in space due to power supply (e.g. in cases where each group of light emitting elements requires an individual power supply) and heat dissipation constraints. Though the claimed apparatus and method relate to a rotating display 100, such advantages are obtainable when using the such apparatus and methods to drive any suitable display. This is shown in FIG. 3 which illustrates a single processor 204, providing data to groups 308-310 (9 are shown but many more could be used), each comprising multiple subsets 110 of light emitting elements 108. Five light emitting elements 108 are shown in each subset 1108 but many more could be used.

Providing the data to the light emitting elements 108 as described herein allows a single processor 204 to address a large number of light emitting elements with reduced latency and minimise signal path length and thus minimised signal degradation. It achieves this by grouping the light emitting elements 108 and outputting data to groups on a single data line, which is then demultiplexed such that the data is received by the group in the required format. This is in contrast to a system wherein all of the light emitting elements are wired in series and addressed using a single data line, which exhibits both increased latency and signal degradation due to the longer signal path length. The light emitting elements may be matrix addressed. More specifically, the light emitting elements may be actively or passively matrix addressed.

Furthermore, the serialised format allows the light emitting elements 108 to refresh/update each colour component separately and sequentially, rather than having to refresh all of the colour components simultaneously. This can be beneficial, as the light emitting elements 108 may only be required to read in on colour component at a time, reducing their hardware requirements (e.g. circuit complexity and/or chip area).

The dividing may be performed in hardware, software, or a combination of hardware and software. The dividing may be performed using one or more of delay lines, fixed logic circuitry, volatile or non-volatile memory. The processor 204 may be a generic CPU, GPU or FPGA or may comprise dedicated, fixed function circuitry configured to perform the dividing. For example, the processor 204 may include one or more of delay lines, fixed logic circuitry, volatile or non-volatile memory configured to perform the dividing. The demultiplexers 306 may be embodied on one or more FPGAs.

Applying method 400 as described above allows a large-scale display to driven. Method 400 is particularly advantageous when combined with a moving display, such as display 100 shown in FIG. 1. The present invention allows live data to be provided to a moving display, said data previously having to have been entirely stored on the moving parts of the apparatus, for example in computer memory. The processor 204, e.g. a GPU, can receive and divide data into a convenient format, requiring the downstream hardware components to simply distribute data and provide it to the light emitting elements in a suitable format and at a suitable rate. This allows the hardware to be particularly compact, such that it can be located on the moving part of a display. Any subset of the components 204, 210, 304, and 306 as shown in FIG. 3 may be located on the moving part of the display 100, i.e. on the display panel. For example, all of these parts may be located on the moving part of the display 100.

The general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

The invention claimed is:
1. A rotating display for creating a three-dimensional image, the rotating display comprising:
    a display panel configured to rotate about an axis, the display panel comprising a plurality of groups of light emitting elements, each light emitting element being individually controllable and configured to display a plurality of pixels of the three-dimensional image;
    a processor configured to receive pixel data for the display panel and divide the pixel data into a plurality of pixel data lines such that pixel data comprising a plurality of bits for each individual pixel is serialised on one of the pixel data lines of the plurality of pixel data lines, each pixel data line comprising pixel data for only one of the groups of light emitting elements;
    a buffer configured to receive one or more of the pixel data lines;
    for each group of light emitting elements:
        a demultiplexer configured to receive a pixel data line and provide pixel data to each light emitting element of the group according to a refresh rate of the display panel; and
    wherein the display panel is configured to rotate about the axis at a rate commensurate with the refresh rate of the display panel.

2. The rotating display as claimed in claim 1, wherein the pixel data received by the processor comprises a two-dimensional video frame to be displayed on the display panel.

3. The rotating display as claimed in claim 1, wherein the pixel data received by the processor comprises a plurality of channels for each pixel and the data for each pixel being arranged sequentially such that data for all of the channels for a given pixel precedes the data for all of the channels for the next pixel in the sequence.

4. The rotating display as claimed in claim 1, wherein each group of light emitting elements comprises a plurality of subsets of light emitting elements, each subset consisting of a plurality of light emitting elements wired in series.

5. The rotating display as claimed in claim 1, wherein the processor is further configured to interlace the pixel data corresponding to two or more pixels on one or more of the pixel data lines.

6. The rotating display as claimed in claim 1, wherein the processor is further configured to output supplementary data on a supplementary data line, wherein the supplementary data comprises one or more of: status data indicating the status of the processor, and an error checking code.

7. The rotating display as claimed in claim 1, wherein the brightness of each light emitting element is controlled in dependence on its distance from the axis of rotation of the display panel.

8. The rotating display as claimed in claim 7, wherein the brightness of each light emitting element increases commensurate with its distance from the axis of rotation of the display panel.

9. The rotating display as claimed in claim 7, wherein the brightness of the light emitting elements is controlled by one or more of: the display panel being configured to vary the current provided to the light emitting elements, and the processor being configured to scale the pixel data.

10. The rotating display as claimed in claim 1, wherein the processor is configured to receive pixel data encoded according to a differential signalling protocol.

11. The rotating display as claimed in claim 1, wherein the display panel is configured to rotate about the axis such that the rate of rotation of the display panel is a factor of the refresh rate of the display panel.

12. The rotating display as claimed in claim 1, wherein each demultiplexer comprises a serial-in parallel-out shift register.

13. The rotating display as claimed in claim 12, wherein each group of light emitting elements comprises a plurality of subsets of light emitting elements, each subset consisting of a plurality of light emitting elements wired in series wherein each parallel output of each demultiplexer is configured to provide data to only one of the subsets of light emitting elements.

14. The rotating display as claimed in claim 1, wherein one or both of the pixel data received by the processor and the pixel data on the pixel data lines is uncompressed.

15. The rotating display as claimed in claim 1, wherein the processor is configured to output the pixel data lines at a rate commensurate with the rate of rotation of the display panel about the axis.

16. The rotating display as claimed in claim 1, wherein the buffer comprises dynamic random access memory.

17. The rotating display as claimed in claim 1, wherein the light emitting elements are arranged in rows that are not parallel with an intended point of view for all angular positions of the display panel about the axis.

18. The rotating display as claimed in claim 1, wherein the light emitting elements may be matrix addressed.

19. The rotating display as claimed in claim 1, wherein the processor is fixed to the display panel.

20. A method of creating a three-dimensional image using a rotating display, the rotating display comprising a display panel configured to rotate about an axis, the display panel comprising a plurality of groups of light emitting elements, each light emitting element being individually controllable and configured to display a plurality of pixels of the three-dimensional image, a processor, one or more buffers, and for each group of light emitting elements, a demultiplexer, the method comprising:
  receiving pixel data at the processor for the display panel and dividing the pixel data at the processor into a plurality of pixel data lines such that pixel data comprising a plurality of bits for each individual pixel is serialised on one of the pixel data lines of the plurality of pixel data lines, each pixel data line comprising pixel data for only one of the groups of light emitting elements;
  buffering the pixel data lines at the one or more buffers;
  for each group of light emitting elements:
    receiving the respective pixel data line from the one or more buffers at a corresponding demultiplexer and providing pixel data to each light emitting element of the group according to a refresh rate of the display panel; and
  rotating the display panel about the axis at a rate commensurate with the refresh rate of the display panel.

* * * * *